US 7,369,391 B2

(12) United States Patent
Tanaka et al.

(10) Patent No.: US 7,369,391 B2
(45) Date of Patent: May 6, 2008

(54) DRIVE CIRCUIT OF DIRECT-CURRENT VOLTAGE-DRIVEN MAGNETIC CONTACTOR AND POWER CONVERTER

(75) Inventors: Tetsuo Tanaka, Tokyo (JP); Tarou Andou, Tokyo (JP); Tsuyoshi Sekiguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 128 days.

(21) Appl. No.: 10/575,464

(22) PCT Filed: Aug. 10, 2004

(86) PCT No.: PCT/JP2004/011478

§ 371 (c)(1),
(2), (4) Date: Apr. 12, 2006

(87) PCT Pub. No.: WO2006/016400

PCT Pub. Date: Feb. 16, 2006

(65) Prior Publication Data
US 2007/0138993 A1 Jun. 21, 2007

(51) Int. Cl.
*H01H 47/00* (2006.01)
*H01H 47/04* (2006.01)
*H01H 47/32* (2006.01)

(52) U.S. Cl. .................. 361/156; 361/154; 361/155; 361/160

(58) Field of Classification Search ............... 361/156, 361/154, 155, 160
See application file for complete search history.

(56) References Cited

U.S. PATENT DOCUMENTS

| 5,202,813 A | * | 4/1993 | Uota et al. .................. 361/154 |
| 5,416,665 A | * | 5/1995 | Nishiwaki et al. .......... 361/154 |
| 6,169,431 B1 | * | 1/2001 | Xu ............................. 327/109 |

FOREIGN PATENT DOCUMENTS

| JP | 61-93529 A | 5/1986 |
| JP | 3-55232 Y2 | 12/1991 |
| JP | 5-291031 A | 11/1993 |
| JP | 6-38359 A | 2/1994 |
| JP | 7-220598 A | 8/1995 |
| JP | 8-17315 A | 1/1996 |

* cited by examiner

*Primary Examiner*—Robert L. Deberadinis
*Assistant Examiner*—Zeev Kitov
(74) *Attorney, Agent, or Firm*—Sughrue Mion, PLLC (57) ABSTRACT

In a direct-current voltage-driven magnetic contactor, a main contact is in an open circuit condition in an attraction period of an initial period of excitation by an operating coil, and in a closed circuit condition in a subsequent holding period, and a drive circuit includes a direct-current power supply voltage detecting circuit that gives a start signal when an applied voltage of a exciting direct-current power supply exceeds a predetermined value, a first drive circuit that makes a starting semiconductor switching element perform an ON operation on receiving the start signal, and a second drive circuit that makes a current limiting semiconductor switching element perform a switching operation when a terminal voltage of a charging capacitor reaches the predetermined value.

6 Claims, 7 Drawing Sheets

DRIVE CIRCUIT OF DIRECT-CURRENT VOLTAGE-DRIVEN MAGNETIC CONTACTOR AND POWER CONVERTER

TECHNICAL FIELD

The present invention relates to a drive circuit of a direct-current voltage-driven magnetic contactor and a power converter.

BACKGROUND ART

For switching control of a magnetic contactor (electromagnetic contactor), an exciting current to be supplied to an operating coil is adjusted to thereby control a main contact, which is in an open circuit condition as a result of charging by a spring force, into a state that can be attracted, and then, the main contact is held and shifted to a closed circuit condition. Drive systems of operating coils include a direct-current voltage-driven type system and an alternating-current voltage-driven type system. Patent Document 1 and 2 have been known as drive circuits for switching a direct-current voltage-driven magnetic contactor to an attracting condition and a holding condition.

Namely, Patent Document 1 discloses an operating circuit of a switch, in which a switch, a switch operating coil, and a field-effect transistor are connected in series, and a gate circuit generates a continuous closing on-gate signal for a fixed time after the switch has been closed, and generates an on/off gate signal for holding a fixed frequency and a predetermined duty ratio after the fixed time has passed, so that the field-effect transistor is turned on and off by an output signal from the gate circuit.

In addition, Patent Document 2 discloses a direct-current electromagnetic device provided with an operating coil, a switching element, and a current detecting resistor connected to the operating coil in series, a one-shot pulse generating circuit that generates a one-shot pulse having a pulse width corresponding to an energization time of a closing coil current of the operating coil, and a comparator for outputting, in an output period of this one-shot pulse, a control signal that controls a coil current of the operating coil to a set current proportional to a power supply voltage to the switching element.

In short, in the conventional technology, a drive circuit of a direct-current voltage-driven magnetic contactor includes a semiconductor switching element and a current detecting resistor connected in series to an operating coil of the magnetic contactor, and an attracting condition and a holding condition have been switched over by controlling the width of an ON-time of the semiconductor switching element.

On the other hand, consider a power converter that temporarily forward-converts an alternating-current power using a rectifier, accumulates the same in a smoothing capacitor, gives a terminal voltage of the smoothing capacitor to a switching circuit including semiconductor switching elements, and inverse-converts the same to an alternating-current power having a frequency required for driving an electric motor. In such a power converter, in order to suppress a great current from flowing into the smoothing capacitor at power-on, an inrush current suppression circuit is provided between the rectifier and the smoothing capacitor. The inrush current suppression circuit is structured so that, immediately after power-on, a current suppression resistor is interposed between the rectifier and the smoothing capacitor to suppress an inrush current, and thereafter, both ends of the current suppression resistor are brought in a short-circuited state by a short circuit. A direct-current voltage-driven magnetic contactor has been used for this short circuit. In the case of the direct-current voltage-driven magnetic contactor, the drive circuit as described above is provided in an accompanying manner.

Patent Document 1: Japanese Published Unexamined Patent Application No. S61-93529
Patent Document 2: Japanese Published Unexamined Patent Application No. H05-291031

DISCLOSURE OF INVENTION

Problem to be Solved by the Invention

However, the conventional drive circuit, which switches over an attracting condition and a holding condition by controlling the width of an ON-time of the semiconductor switching element, requires a complicated circuit for switching over an attracting condition and a holding condition. Moreover, because control is complicated, it is difficult to reduce the drive circuit in size and cost.

Moreover, in the direct-current voltage-driven magnetic contactor, a direct-current driving power supply controlled to a fixed voltage is required for exciting the operating coil. Since a thick wire rod is used for the operating coil, the magnetic contactor is greater in size and more expensive than an alternating-current voltage-driven magnetic contactor. For such reasons, in a system using a direct-current voltage-driven magnetic contactor provided with a conventional drive circuit as an inrush current suppression circuit of a power converter, a reduction in size and cost of an inrush current suppression circuit cannot be realized.

Moreover, in the inrush current suppression circuit, since the direct-current voltage-driven magnetic contactor must be operated at a point in time where the smoothing capacitor has been completely charged, a start circuit of the direct-current voltage-driven magnetic contactor is required, and a direct-current power supply for this start circuit is required. In this respect as well, size and cost of the inrush current suppression circuit cannot be reduced.

The present invention has been made in view of the problems described above, and an object thereof is to provide a drive circuit that can reduce size and cost of a direct-current voltage-driven magnetic contactor.

Moreover, an object of the present invention is to provide a power converter provided with an inrush current suppression circuit for which size and cost has been reduced using a direct-current voltage-driven magnetic contactor provided with a drive circuit according to the present invention.

Means for Solving Problem

To achieve the above objectives, according to one aspect of the present invention, in a drive circuit of a direct-current voltage-driven magnetic contactor including an operating coil that is capable of a direct-current excitation, a main contact that is in an open circuit condition in an attracting period of an initial period of excitation by the operating coil and is in a closed circuit condition in the following holding period, and an auxiliary contact that carries out a reverse opening and closing operation from the main contact is connected to a positive electrode side of the exciting direct-current power supply and the other end of the same is connected to one end of the auxiliary contact, the drive circuit includes a starting semiconductor switching element provided between the other end of the auxiliary contact and a negative electrode side of the exciting direct-current power supply; a direct-current power supply voltage detecting circuit that outputs a start instruction signal when an applied voltage of the exciting direct-current power supply has exceeded a predetermined value; a driving direct-current power supply whose negative electrode side is connected to the negative electrode side of the exciting direct-current power supply; a first drive circuit that makes the starting semiconductor switching element perform an ON operation upon receiving the start instruction signal, using the driving direct-current power supply as an operating power supply; a charging capacitor whose one end is connected to a positive electrode side of the driving direct-current power supply via a diode and whose other end is connected to the other end of the auxiliary contact; a current limiting semiconductor switching element connected in parallel to the auxiliary contact; and a second drive circuit that makes the current limiting semiconductor switching element perform a switching operation when a terminal voltage of the charging capacitor has reached a predetermined value.

According to the present invention, when an applied voltage of the exciting direct-current power supply has risen to a predetermined value, a start circuit composed of the first driving circuit and starting semiconductor switching element operates using the driving direct-current power supply as an operating power supply, and forms a current path that passes through the starting semiconductor switching element from the auxiliary contact. Thereby, a charging path loop from the driving direct-current power supply to the charging capacitor is formed via the starting semiconductor switching element. When the charging capacitor is completely charged, the second drive circuit uses a terminal voltage of the charging capacitor as a starting power supply to make the current limiting semiconductor switching element perform a switching operation at a fixed cycle. Because the auxiliary contact performs an opening circuit operation after an elapse of an attracting period, the current path of the operating coil switches to a route that passes through the current limiting semiconductor switching element, and to the operating coil, a current chopper-controlled by the current limiting semiconductor switching element flows. The main contact performs a closing circuit operation after an elapse of an attracting period. Because no special control is carried out in this switchover from an attracting period to a holding period, the circuit configuration can be simplified. Because an exciting current that flows to the operating coil is made into a minute current by chopper control, it is unnecessary to use a thick wire rod for the operating coil, and thus size and cost of the direct-current voltage-driven magnetic contactor can be reduced. In addition, because the first drive circuit and the second drive circuit use the driving direct-current power supply as a common power supply, size can be reduced and the circuit configuration can be simplified. Furthermore, because it is sufficient to carry out only chopper control without changing the width of an ON-time of the current limiting semiconductor switching element, the circuit configuration can be simplified.

EFFECT OF THE INVENTION

The present invention provides an effect such that, in addition to a reducing size and cost of a direct-current voltage-driven magnetic contractor, a drive circuit can be simplified.

EXPLANATIONS OF LETTERS OR NUMERALS

1 Exciting direct-current power supply
2 Free-wheeling diode
3 Operating coil
4 Main contact
5 Auxiliary contact
6 Current limiting semiconductor switching element
7 Current detecting shunt resistor
8 Resistor
9 Capacitor
10 Drive circuit of a current limiting semiconductor switching element
11 Charging capacitor
12 Charging current limiting resistor
13 Rectifying diode
14 Resistor
15 Starting semiconductor switching element
16 Drive circuit of a starting semiconductor switching element
17 Driving direct-current power supply
18 Exciting direct-current power supply voltage detecting circuit
31 Three-phase alternating-current power supply
32 Rectifier circuit
34 Smoothing capacitor
35 Switching circuit
36 Electric motor
37 Inrush current suppression circuit
38 Inrush current suppression resistor

BEST MODE(S) FOR CARRYING OUT THE INVENTION

Exemplary embodiments of a drive circuit of a direct-current voltage-driven magnetic contactor and a power converter according to the present invention will be explained in detail below, with reference to the accompanying drawings.

Figure 1:
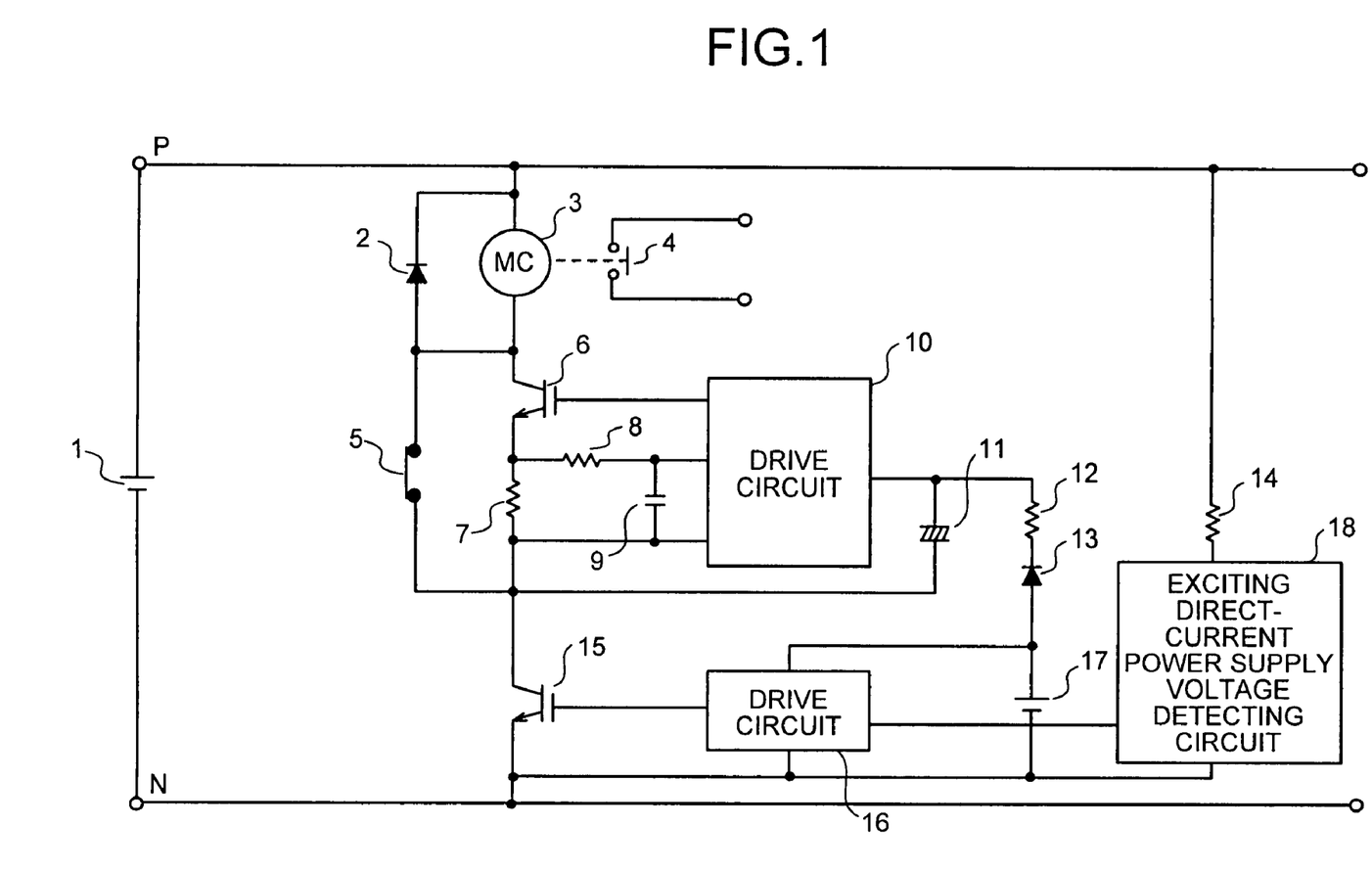
FIG. 1 is a circuit diagram of a drive circuit in a direct-current voltage-driven magnetic contactor according to a first embodiment of the present invention.

FIG. 1 is a circuit diagram of a drive circuit in a direct-current voltage-driven magnetic contactor according to a first embodiment of the present invention. In FIG. 1, the direct-current voltage-driven magnetic contactor is provided with an operating coil 3 capable of a direct-current excitation, a main contact 4 that is in an open circuit condition in an attracting period of an initial period of excitation by this operating coil 3 and is in a closed circuit condition in the following holding period, and an auxiliary contact 5, a so-called b-contact, that carries out an opening and closing operation reverse of the main contact 4. Hereinafter, the direct-current voltage-driven magnetic contactor will be simply abbreviated to MC unless it is necessary to make a distinction.

One end of the operating coil 3 of the MC is connected to a positive electrode side P of an exciting direct-current power supply 1 together with a cathode of a free-wheeling diode 2. The other end of the operating coil 3 of the MC is connected to one end of the auxiliary contact 5 together with an anode of the free-wheeling diode 2. A series circuit of a current limiting semiconductor switching element 6 and a current detecting shunt resistor 7 is connected between the both ends of the auxiliary contact 5. A control electrode of the current limiting semiconductor switching circuit 6 is connected to a control signal output end of a drive circuit 10.

One end of a resistor 8 is connected to a connection end between one end of the current detecting shunt resistor 7 and the current limiting semiconductor switching element 6, and the other end of the resistor 8 is connected to one end of a capacitor 9 and one current monitoring end of the drive circuit 10. The other end of the capacitor 9, together with the other end of the current detecting shunt resistor 7, is connected to the other current monitoring end of the drive circuit 10. The resistor 8 and the capacitor 9 construct a low-pass filter as a whole.

A starting semiconductor switching element 15 is provided between a negative electrode side N of the exciting direct-current power supply 1 and a connection end that is between the other end of the current detecting shunt resistor 7 and the other end of the auxiliary contact 5. A control electrode of the starting semiconductor switching element 15 is connected to a control signal output end of a drive circuit 16.

Further, one end of a charging capacitor 11 is connected to a connection end between the other end of the current detecting shunt resistor 7 and the other end of the auxiliary contact 5, and the other end of the charging capacitor 11 is connected to a starting voltage input end of the drive circuit 10 and an end of a charging current limiting resistor 12. The other end of the charging current limiting resistor 12 is connected to a cathode of a rectifying diode 13, and an anode of the rectifying diode 13 is connected to a positive electrode end of a driving direct-current power supply 17 and a power supply end of the drive circuit 16.

A negative electrode end of the driving direct-current power supply 17 and a ground end of the drive circuit 16, together with a ground end of an exciting direct-current power supply voltage detecting circuit 18, are connected to the negative electrode side N of the exciting direct-current power supply 1. A detecting voltage input end of the exciting direct-current power supply voltage detecting circuit 18 is connected to the positive electrode end P of the exciting direct-current power supply 1 via a resistor 14.

Figure 2:
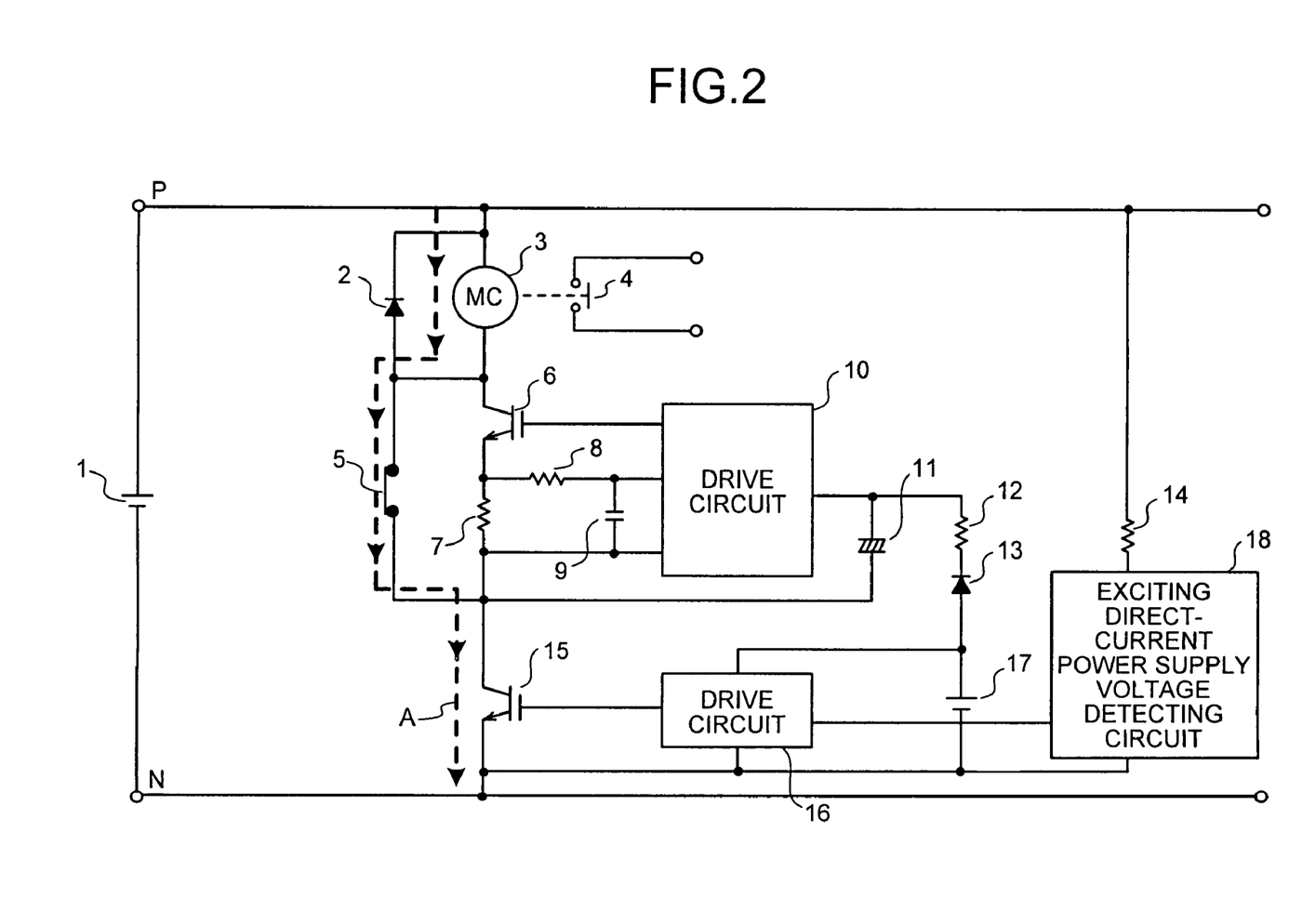
FIG. 2 is a diagram for explaining an attraction current control operation of the drive circuit of the direct-current voltage-driven magnetic contactor shown in FIG. 1.
Figure 3:
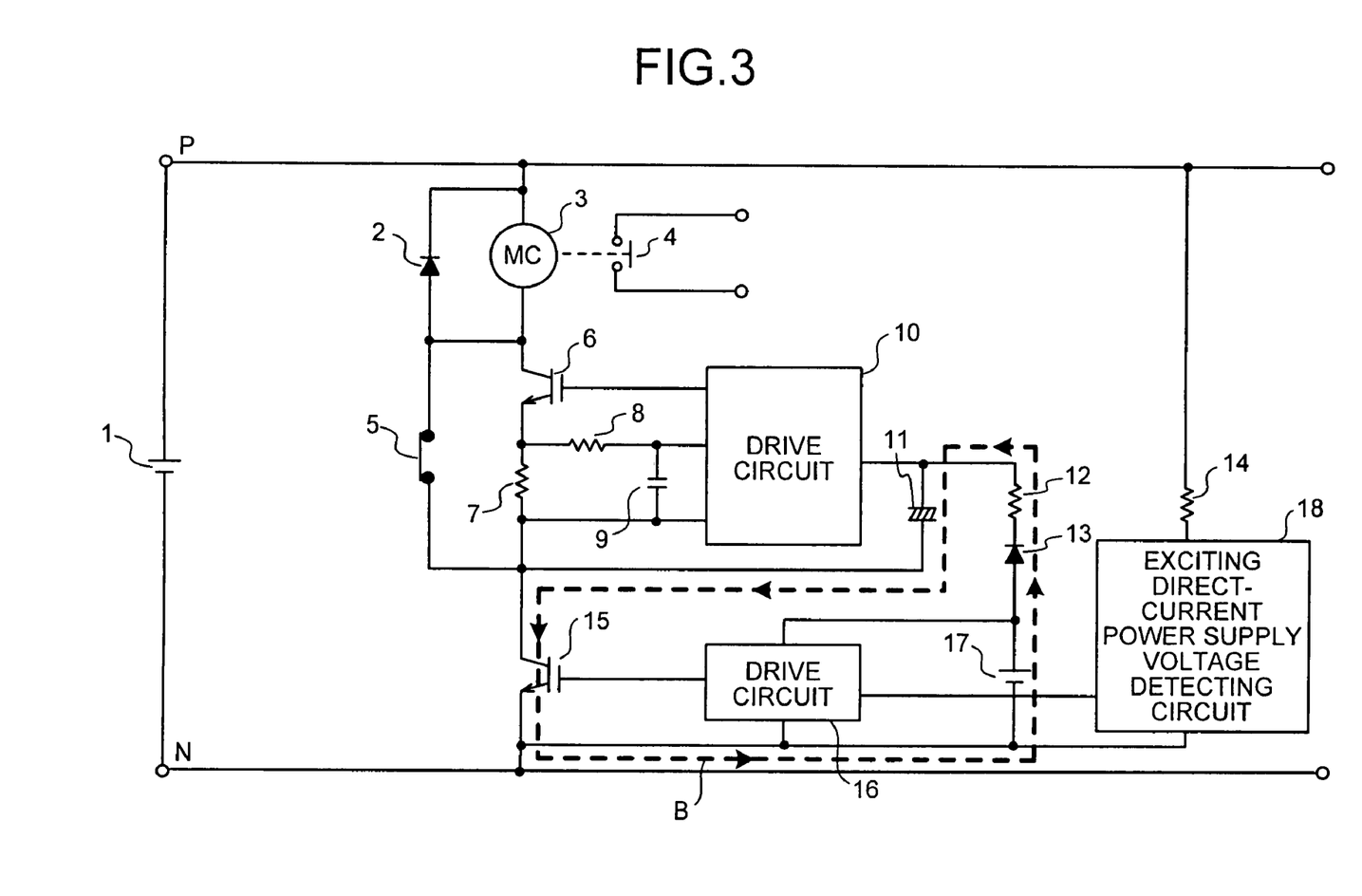
FIG. 3 is a diagram for explaining a charging operation carried out at the time of attraction of the drive circuit of the direct-current voltage-driven magnetic contactor shown in FIG. 1.
Figure 4:
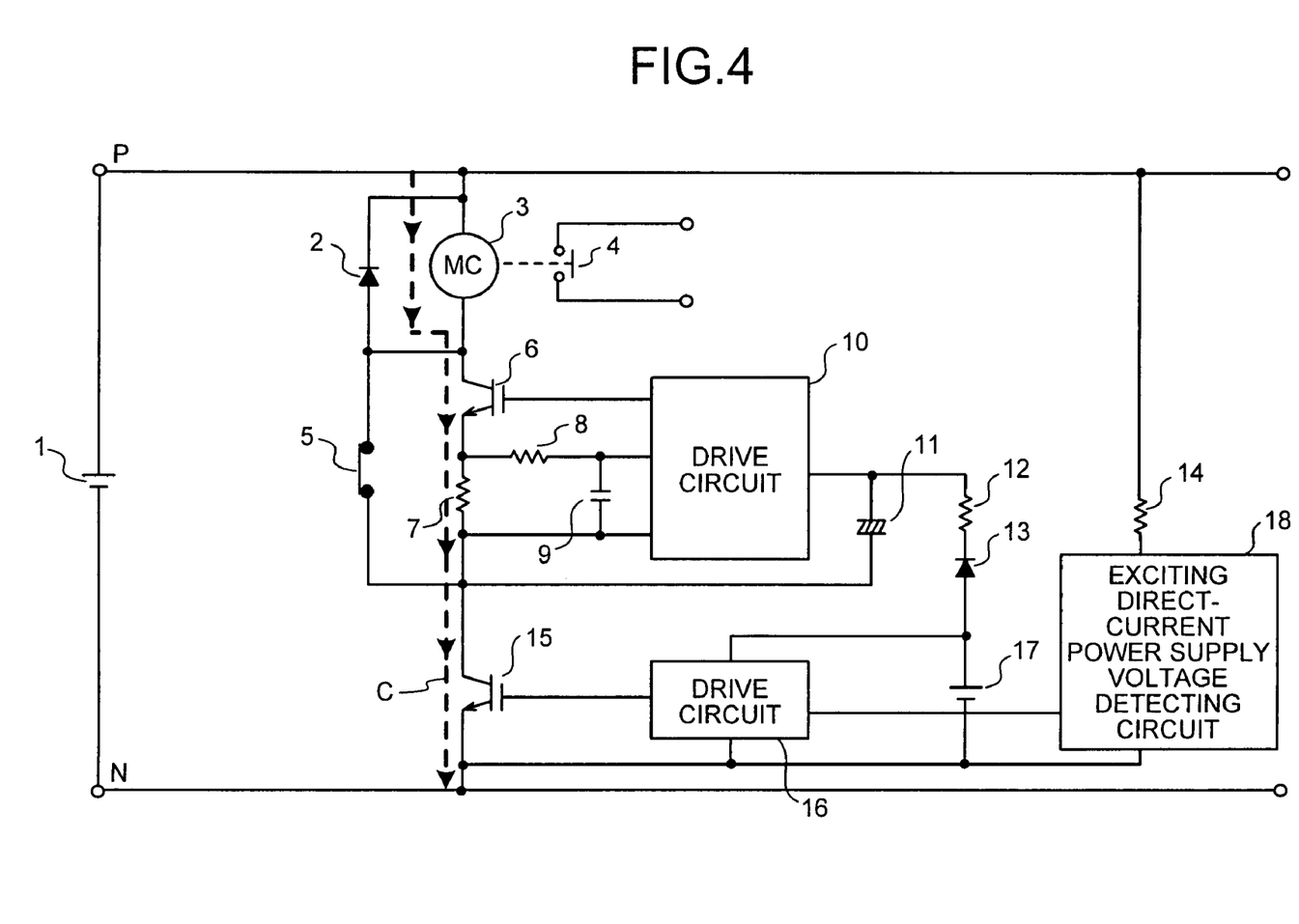
FIG. 4 is a diagram for explaining a holding current control operation of the drive circuit of the direct-current voltage-driven magnetic contactor shown in FIG. 1.
Figure 5:
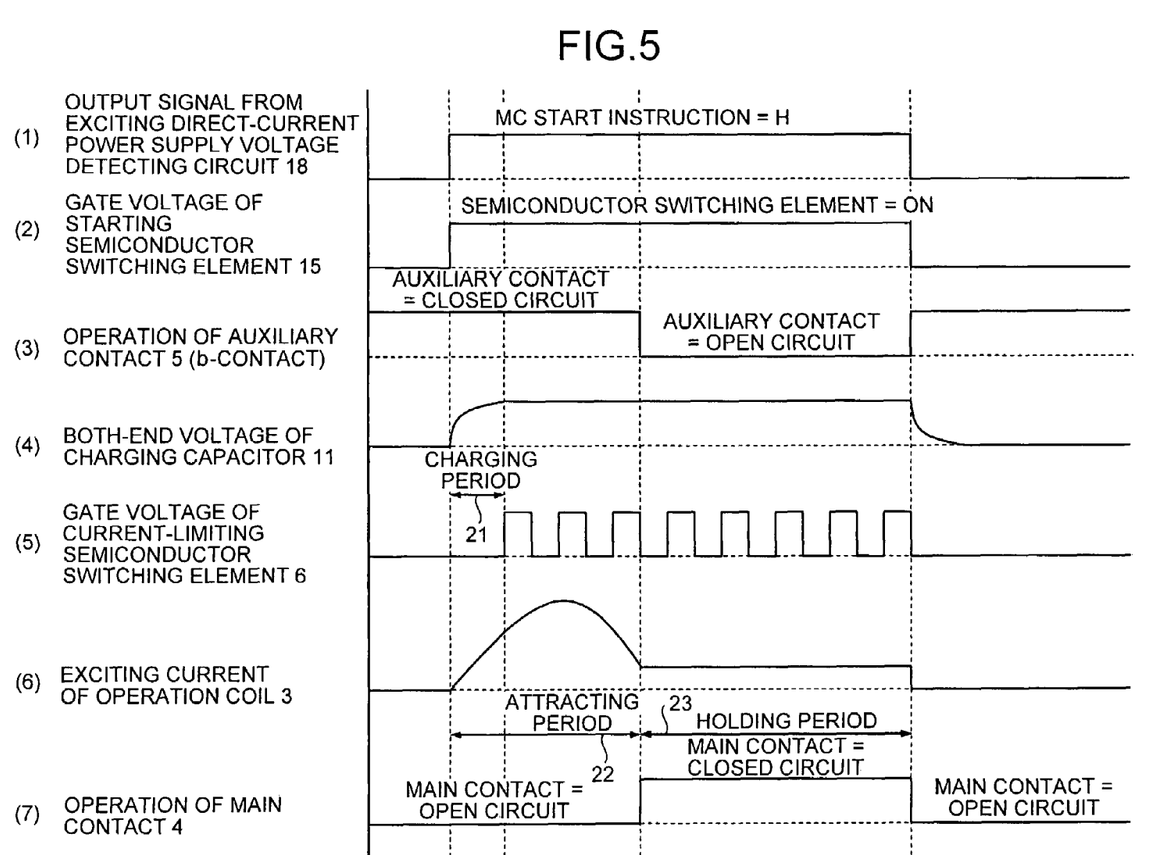
FIG. 5 is a time chart of operations of respective units in a course from an attraction current control operation to a holding current control operation of the drive circuit of the direct-current voltage-driven magnetic contactor shown in FIG. 1.

Next, operations of the drive circuit of the MC constructed as above will be explained with reference to FIG. 2 to FIG. 5. FIG. 2 is a diagram for explaining an attraction current control operation of the drive circuit of the MC shown in FIG. 1. FIG. 3 is a diagram for explaining a charging operation carried out at the time of attraction of the drive circuit of the MC shown in FIG. 1. FIG. 4 is a diagram for explaining a holding current control operation of the drive circuit of the MC shown in FIG. 1. FIG. 5 is a time chart of operations of respective units in a course from an attraction current control operation to a holding current control operation of the drive circuit of the MC shown in FIG. 1.

As shown in FIG. 2, when voltage is applied to the exciting direct-current power supply 1, the applied voltage is inputted into the exciting direct-current power supply voltage detecting circuit 18 via the resistor 14. Upon detecting a rise of the applied voltage of the exciting direct-current power supply 1 to a prescribed value, the exciting direct-current power supply voltage detecting circuit 18 outputs an MC start instruction signal to the drive circuit 16. The MC start instruction signal maintains one of the binary levels for a period where the voltage of the exciting direct-current power supply 1 is above the prescribed value. Then, upon receiving the MC start instruction signal, the drive circuit 16 makes the starting semiconductor switching element 15 perform an ON operation for a period indicated by the MC start instruction signal.

At this time, the auxiliary contact 5 is in a closed circuit condition, when the starting semiconductor switching element 15 performs an ON operation, as shown in FIG. 2, an attraction current path A from the positive electrode end P of the exciting direct-current power supply 1, the operating coil 3, the auxiliary contact 5, and the starting semiconductor switching element 15, to the negative electrode end N of the exciting direct-current power supply 1 is formed. Therefore, an attraction current for attracting the main contact 4 flows to the operating coil 3, whereby the operating coil 3 is excited.

When the starting semiconductor switching element 15 performs an ON operation, simultaneously, as shown in FIG. 3, a loop of a charging path B from the positive electrode end of the driving direct-current power supply 17, the rectifying diode 13, the charging current limiting resistor 12, the charging capacitor 11, the starting semiconductor switching element 15, and negative electrode end N of the exciting direct-current power supply 1, to the negative electrode end of the driving direct-current power supply 17 is formed. Therefore, during the ON operation of the starting semiconductor switching element 15, the driving direct-current power supply 17 charges the charging capacitor 11. The charging time is determined based on resistance of the charging current limiting resistor 12 and capacitance of the charging capacitor 11.

When the charging capacitor 11 is completely charged, the drive circuit 10 uses the charged voltage as a starting power supply to give a drive instruction (on/off control signal) to the current limiting semiconductor switching element 6 so that the current limiting semiconductor switching element 6 is switched at a preset frequency and starts a switching operation. Herein, the drive circuit 10 generates a drive instruction (on/off control signal) without using a circuit of the current detecting shunt resistor 7, the resistor 8, and the capacitor 9.

Then, when a sufficient attraction current flows to the operating coil 3 and attraction of the main contact 4 is completed, the main contact 4 is in a closed circuit condition, and the auxiliary contact 5 is simultaneously in an open circuit condition. Therefore, the current path that flows to the operating coil 3 changes, as shown in FIG. 4, to a holding current path C from the positive electrode end P of the exciting direct-current power supply 1, the operating coil 3, the current limiting semiconductor switching element 6, the current detecting shunt resistor 7, and the starting semiconductor switching element 15, to the negative electrode end N of the exciting direct-current power supply 1, and a holding current for holding the main contact 4 flows.

Operations of the respective units in the above operation course are as shown in FIG. 5. (1) An MC start instruction signal, which is an output signal from the exciting direct-current power supply voltage detecting circuit 18, is at a low level (hereinafter, "L-level") until a voltage of the exciting direct-current power supply 1 reaches a prescribed value, however, this rises to a high level (hereinafter, "H-level") when the voltage has exceeded the prescribed value, and maintains the H-level for a period where the voltage of the exciting direct-current power supply 1 is above the prescribed value.

(2) Because a gate voltage applied from the drive circuit 16 to a gate electrode of the starting semiconductor switching element 15 is at a H-level for a period where the MC start instruction signal is at a H-level, the starting semiconductor switching element 15 continues performing an ON operation for the period where the MC start instruction signal is at a H-level.

(3) The auxiliary contact 5 is in a closed circuit condition before the exciting direct-current power supply 1 is turned on, maintains the closed circuit condition after power-on of the exciting direct-current power supply 1 until an excitation sufficient for the operating coil 3 to attract the main contact 4 is carried out, switches to an open circuit condition when the excitation sufficient for the operating coil 3 to attract the main contact 4 has been carried out, maintains the open circuit condition until the exciting direct-current power supply 1 is shut down, and returns to the original closed circuit condition when the exciting direct-current power supply 1 has been shut down.

(4) A both-end voltage of the charging capacitor 11 rises in response to an ON operation of the starting semiconductor switching element 15, reaches a fixed voltage through a predetermined charging period 21, and maintains the voltage until the exciting direct-current power supply 1 is shut down, and discharges and disappears when the exciting direct-current power supply 1 has been shut down.

(5) A fixed-cycled on/off control signal is applied from the drive circuit 10 to a gate electrode of the current limiting semiconductor switching element 6, after an elapse of the charging period 21. This is continued until the exciting direct-current power supply 1 is shut down.

(6) An exciting current of the operating coil 3 is a current having a maximum value so that an excitation sufficient to attract the main contact 4 is carried out in an attracting period 22, and becomes a fixed-amplitude current when the excitation sufficient to attract the main contact 4 has been carried out and the attracting period 22 has switched to a holding period 23.

(7) The main contact 4 is in an open circuit condition before the exciting direct-current power supply 1 is turned on, maintains the open circuit condition after power-on of the exciting direct-current power supply 1 until the attracting period 22 where an excitation sufficient for the operating coil 3 to attract the main contact 4 is carried out ends, switches to a closed circuit condition when the attracting period 22 has ended and switched to the holding period 23, maintains the closed circuit condition until the exciting direct-current power supply 1 is shut down, and returns to the original open circuit condition when the exciting direct-current power supply 1 has been shut down.

As such, in the first embodiment, a system for switching over an attracting condition and a holding condition of the operating coil is the auxiliary contact (b-contact), which reaches an open circuit condition when the main contact is in a closed circuit condition and reaches a closed circuit condition when the main contact is in an open circuit condition, and which the MC itself has originally reached. Therefore, a complicated circuit to judge an end timing of the attracting condition becomes unnecessary, and thus the drive circuit can be simplified.

In other words, in the conventional system for switching over an attracting condition and a holding condition by controlling an ON-time width of the semiconductor switching element, although the drive circuit has been complicated to switch over the attracting condition and holding condition, this problem can be solved.

Moreover, in the holding period of the main contact, because chopper control is carried out using the current limiting semiconductor, and thus, a fixed holding current can flow irrespective of a fluctuation in voltage of the exciting direct-current power supply. Accordingly, it becomes possible to drive the MC for a direct-current power supply voltage range wider than that of the conventional art.

Moreover, because an MC start circuit has been provided, it becomes possible to securely drive the MC at an arbitrary voltage without using an external circuit even when a rise in the exciting direct-current power supply voltage is slow.

In a current limiting circuit composed of the current limiting semiconductor switching element and its drive circuit, it is sufficient to carry out only chopper control of a holding current as a circuit operation, and hence, the current limiting circuit can be simplified. Because the single driving direct-current power supply 17 can be shared as a driving power supply of the MC start circuit and current limiting circuit, the MC starting circuit can be simplified.

In addition, since a switchover between an attracting condition and a holding condition can be designed by only a charging time constant determined by the charging capacitor 11 being a driving power supply for the current limiting circuit and the charging current limiting resistor 12 and an operation time of the auxiliary contact 5, it becomes possible to simplify the MC drive circuit based on this point as well.

On the other hand, a chopper-controlled exciting current flows as the direct-current voltage-driven MC, to the operating coil. Therefore, for a wire rod of the operating coil, it is unnecessary to use a thick wire rod as in the conventional direct-current voltage-driven MC, and a thin wire rod as in a general-purpose alternating-current voltage-driven MC used for the purpose of a small width of fluctuation in input voltage can be used. Consequently, according to the first embodiment, size and cost of the direct-current voltage-driven MC can be reduced.

Figure 6:
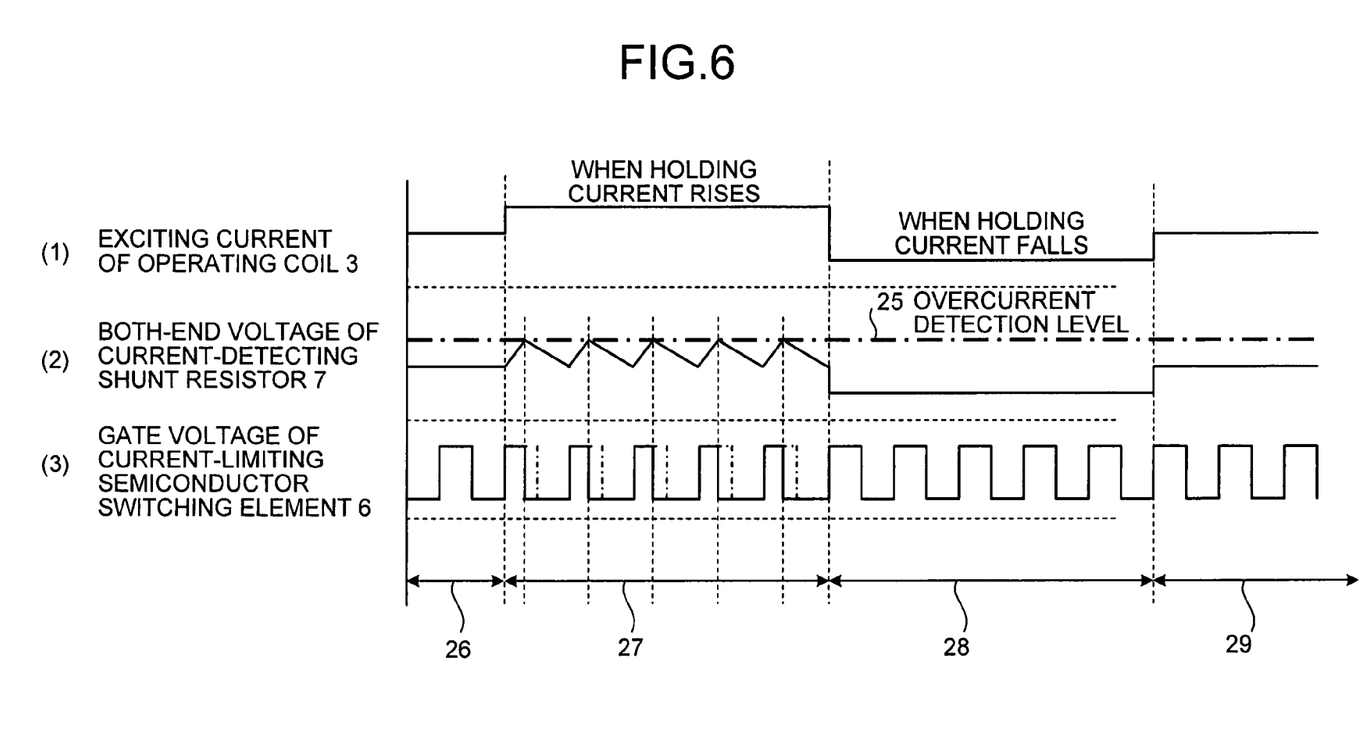
FIG. 6 is a time chart for explaining a stabilizing control operation of a holding current carried out in a drive circuit of a direct-current voltage-driven magnetic contactor according to a second embodiment of the present invention.

FIG. 6 is a time chart for explaining a stabilizing control operation of a holding current carried out in a drive circuit of a direct-current voltage-driven magnetic contactor according to a second embodiment of the present invention. A stabilizing control operation of a holding current that is carried out by the drive circuit 10 at the time of holding current control operation explained in the first embodiment, using the current detecting shunt resistor 7, will be explained in the second embodiment with respect to the configuration shown in FIG. 1. Here, the low-pass filter composed of the resistor 8 and the capacitor 9 is provided, since an exciting current that flows to the operating coil is a chopper-controlled minute current, to securely extract a DC component of the same.

In the configuration shown in FIG. 1, in the present embodiment 2, at the time of holding current control operation explained in the first embodiment, the drive circuit 10 monitors a terminal voltage of the current limiting shunt resistor 7 via the low-pass filter composed of the resistor 8 and the capacitor 9 in terms of the illustrated example, and carries out control so as to make the current limiting semiconductor switching element 6 perform an ON/OFF operation at a fixed cycle when the terminal voltage is equal to or less than a prescribed value, and extending an OFF operation period of the current limiting semiconductor switching element 6 when the terminal voltage has exceeded a prescribed value.

Operations will be explained in detail with reference to FIG. 6. In the drive circuit 10, an overcurrent detection level 25 is set in advance. After the time of holding current control operation explained in the first embodiment starts, when an exciting current of the operating coil 3 changes as shown in (1) of FIG. 6, in a period 26, a level of the exciting current of the operating coil 3 detected based on a decline in voltage of the current detecting shunt resistor 7 is lower than the overcurrent detection level 25. Therefore, the drive circuit 10 makes the current limiting semiconductor switching element 6 perform an ON/OFF operation at a preset cycle.

In a period 27, the exciting current of the operating coil 3 rises. A level of the exciting current of the operating coil 3 detected based on a decline in voltage of the current detecting shunt resistor 7 is higher than the overcurrent detection level 25. Therefore, the drive circuit 10 carries out control so that an ON operation period of the current limiting semiconductor switching element 6 is shortened according to the degree of rise in the exciting current. As a result, the level of an exciting current of the operating coil 3 is lowered equal to or less than the overcurrent detection level 25.

In periods 28 and 29, although the exciting current level of the operating coil 3 fluctuates, this does not exceed the overcurrent detecting level 25 in either case. Therefore, similar to the period 26, the drive circuit 10 makes the current limiting semiconductor switching element 6 perform an ON/OFF operation at a preset cycle. Thus, a fixed holding current can flow irrespective of a fluctuation in voltage of the exciting direct-current power supply 1.

As such, according to the second embodiment, a holding current is reduced by shortening the ON-time width of the current limiting semiconductor switching element when the exciting direct-current power supply voltage is high and the holding current is large, and a preset ON-time width is used without changing the ON-time width of the current limiting semiconductor switching element when the exciting direct-current power supply voltage is low and the holding current is less. Therefore, it becomes possible to prevent a thermal destruction of the current limiting semiconductor switching element and wire breaking of the operating coil concerned due to an increase in the ON-time width.

Moreover, it is sufficient to make the current limiting semiconductor switching element perform an OFF operation only when the holding current is large. Therefore, a complicated circuit to judge the value of a holding current and control the ON-time width of the current limiting semiconductor switching element is not necessary.

In addition, it is sufficient to make the current limiting semiconductor switching element perform an ON/OFF operation at a preset cycle at a point in time when voltage of the charging capacitor has risen as a normal operation of the current limiting circuit. Therefore, the current limiting circuit can be simplified.

Figure 7:
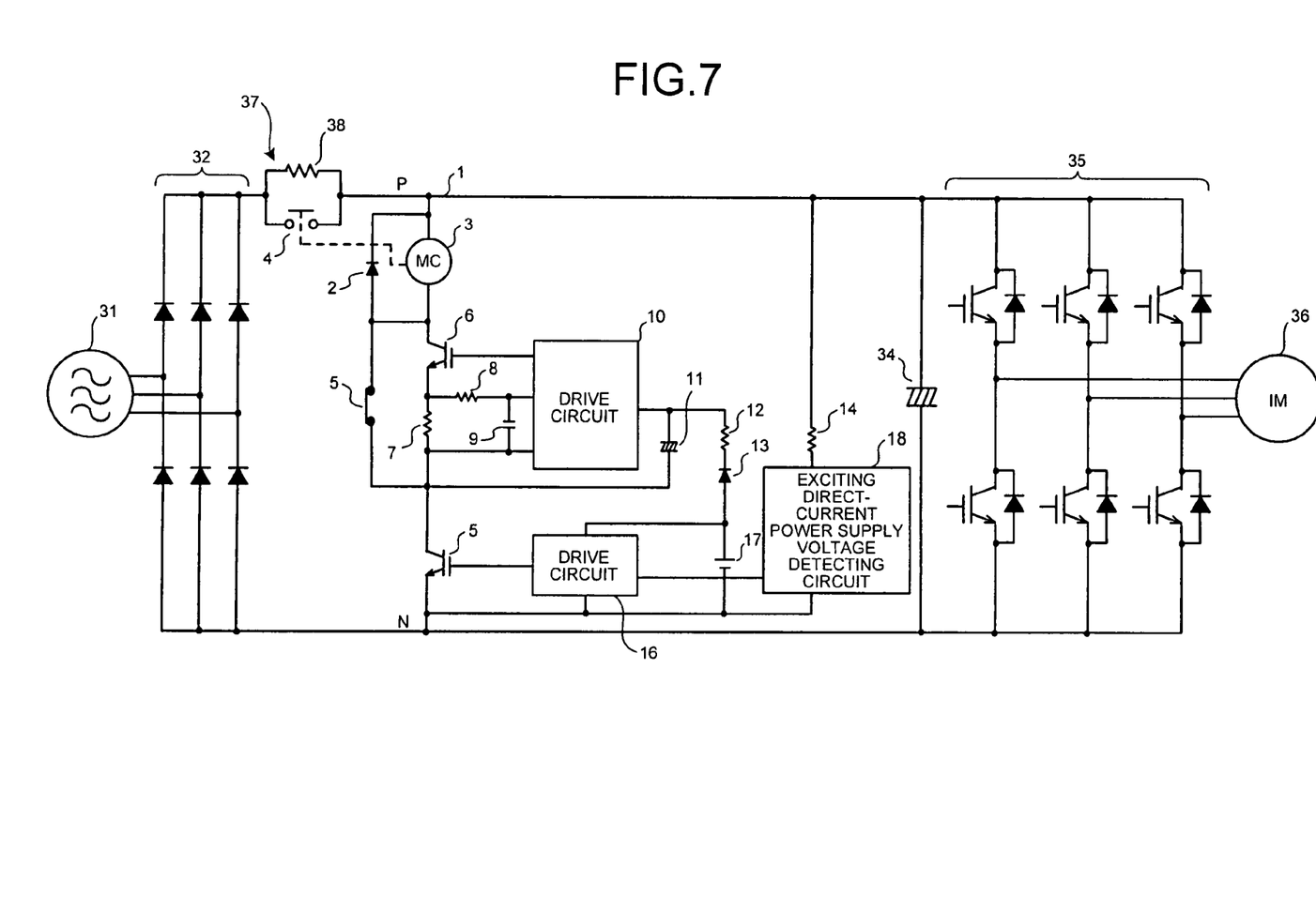
FIG. 7 is a circuit diagram of a power converter according to a third embodiment of the present invention.

FIG. 7 is a circuit diagram of a power converter according to a third embodiment of the present invention. The third embodiment considers a configuration example of a power converter provided with an inrush current suppression circuit in which an MC having the drive circuit described in the first embodiment and second embodiment has been incorporated.

In FIG. 7, the power converter is provided with a rectifying circuit 32 of a diode-bridge configuration that forward-converts an alternating-current power inputted from a three-phase alternating-current power supply 31 to a direct-current power, a smoothing capacitor 34 that smoothes the direct-current power forward-converted by the rectifying circuit 32 and holds the same as a direct-current bus voltage, a switching circuit 35 that inverse-converts the direct-current bus voltage, being a terminal voltage of the smoothing capacitor 34, to an alternating-current by switching the direct-current bus voltage using semiconductor switching elements, and an inrush current suppression circuit 37 provided between the rectifying circuit 32 and smoothing capacitor 34.

The switching circuit 35 includes three sets of two semiconductor switching elements connected in series between a positive electrode side P and a negative electrode side N of the direct-current bus voltage and free-wheeling diodes connected in parallel to the respective semiconductor switching elements, and an electric motor 36 is connected to the three-phase output end composed of three connection ends of the two semiconductor switching elements connected in series.

The inrush current suppression circuit 37 is a circuit for suppressing a large current from flowing into the smoothing capacitor 34 at power-on of the alternating-current power supply 31. In the inrush current suppression circuit 37, an inrush current suppression resistor 38 and the main contact 4 of a direct-current voltage-driven MC having the drive circuit described in the first embodiment and second embodiment have been connected in parallel, and the drive circuit shown in the first embodiment and second embodiment has been incorporated in an accompanying manner.

Herein, the incorporated drive circuit shown in the first embodiment and second embodiment is structured to operate using the direct-current bus voltage, being a terminal voltage of the smoothing capacitor 34, as the exciting direct-current power supply 1. This is because, as explained in the first embodiment, because an exciting current to the operating coil 3 is supplied by chopper control, the drive circuit operates without problem even if there is a slight fluctuation in the exciting direct-current power supply 1.

In the inrush current suppression circuit 37, it is necessary to close the main contact 4 to short-circuit both ends of the inrush current suppression resistor 38 at a point in time where a charge of the smoothing capacitor 34 has been completed. However, in the drive circuit according to the present embodiment, because the exciting direct-current power supply voltage detecting circuit 18 detects a point in time where a charge of the smoothing capacitor 34 has been completed and starts operation, it is unnecessary to provide a separate start circuit that gives a start instruction to a direct-current voltage-driven MC and a power supply for the start circuit as in the conventional art. Thus, size and cost of the inrush current suppression circuit can be reduced.

As explained in the first embodiment, when the drive circuit of a direct-current voltage-driven MC according to the present embodiment is used, for the operating coil of the direct-current voltage-driven MC, it is unnecessary to use a thick wire rod as in the conventional direct-current voltage-driven MC, and a thin wire rod as in a general-purpose alternating-current voltage-driven MC used for the purpose of a small width of fluctuation in input voltage can be used. Therefore, size and cost of the direct-current voltage-driven MC can be reduced. It becomes possible to reduce size and cost of the inrush current suppression circuit based on this point as well.

While carrying out the stabilizing control operation of a holding current shown in FIG. 6 by detecting a decline in voltage of the current detecting shunt resistor 7 via the low-pass filter composed of the resistor 8 and the capacitor 9, the drive circuit 10 extracts a DC component with accuracy from a minute current that flows to the operating coil and judges presence of excess current. Thus, a fixed holding current can flow accurately irrespective of a fluctuation in voltage of the exciting direct-current power supply.

At this time, a shut-down operation of the current limiting semiconductor switching element 6 resulting from a detection of the amount of decline in voltage of the current detecting shunt resistor 7 can be utilized as an overcurrent protecting operation at the time of a short-circuit failure of the current limiting semiconductor switching element 6. Thus, it becomes possible to construct a fail-safe inrush current suppression circuit.

INDUSTRIAL APPLICABILITY

As described above, a drive circuit of a direct-current voltage-driven magnetic contactor according to the present invention is useful for reducing size and cost of the direct-current voltage-driven magnetic contactor, and is, particularly, suitable for use in an inrush current suppression circuit of a power converter for reducing size and cost.

The invention claimed is:

1. A drive circuit of a direct-current voltage-driven magnetic contactor including an operating coil that is capable of direct-current excitation, a main contact that is in an open circuit condition in an attracting period of an initial period of excitation by the operating coil and is in a closed circuit condition in a holding period, the holding period being subsequent to the attracting period, and an auxiliary contact that carries out an opening and closing operation that is reverse with respect to the main contact, and wherein a first end of the operating coil is connected to a positive electrode side of an exciting direct-current power supply and a second end of the operating coil is connected to a first end of the auxiliary contact, the drive circuit comprising:
  a starting semiconductor switching element provided between a second end of the auxiliary contact and a negative electrode side of the exciting direct-current power supply;
  a direct-current power supply voltage detecting circuit that outputs a start instruction signal when an applied voltage of the exciting direct-current power supply exceeds a predetermined value;
  a driving direct-current power supply whose negative electrode side is connected to the negative electrode side of the exciting direct-current power supply;
  a first drive circuit that makes the starting semiconductor switching element perform an ON operation upon receiving the start instruction signal, using the driving direct-current power supply as an operating power supply;
  a charging capacitor whose one end is connected to a positive electrode side of the driving direct-current power supply via a diode, and whose other end is connected to the second end of the auxiliary contact;
  a current limiting semiconductor switching element connected in parallel to the auxiliary contact; and
  a second drive circuit that makes the current limiting semiconductor switching element perform a switching operation when a terminal voltage of the charging capacitor reaches the predetermined value.

2. The drive circuit according to claim 1, wherein
a current detecting resistor is arranged between the second end of the auxiliary contact and a corresponding terminal of the current limiting semiconductor switching element, and
the second drive circuit monitors a terminal voltage of the current detecting resistor, and carries out control to make the current limiting semiconductor switching element perform an ON/OFF operation at a fixed cycle when the terminal voltage is any one of equal to and less than a prescribed value, and extends an OFF operation period of the current limiting semiconductor switching element when the terminal voltage exceeds the prescribed value.

3. The drive circuit according to claim 1, wherein
a current detecting resistor is arranged between the second end of the auxiliary contact and a corresponding terminal of the current limiting semiconductor switching element,
an RC low-pass filter is provided between the current detecting resistor and the second drive circuit, and carries out an opening and closing operation that is reverse with respect to the main contact, and
the second drive circuit monitors a terminal voltage of the current detecting resistor via the RC low-pass filter, and carries out control to make the current limiting semiconductor switching element perform an ON/OFF operation at a fixed cycle when the terminal voltage is any one of equal to and less than a prescribed value, and extends an OFF operation period of the current limiting semiconductor switching element when the terminal voltage exceeds the prescribed value.

4. A power converter comprising:
  a rectifying circuit that forward-converts an inputted alternating-current power to a direct-current power;
  a smoothing capacitor that smoothes a forward-converted direct-current power and holds the forward-converted direct-current power as a direct-current bus voltage;
  a switching circuit that inverse-converts the direct-current bus voltage to an alternating-current by switching the direct-current bus voltage using semiconductor switching elements; and
  an inrush current suppression circuit that is provided between the rectifying circuit and the smoothing capacitor, and that includes a current limiting resistor and a main contact of a direct-current voltage-driven magnetic contactor connected in parallel, wherein in the direct-current voltage-driven magnetic contactor, a first end of an operating coil capable of direct-current excitation is connected to a positive electrode side of the direct-current bus voltage, a second end of the operating coil is connected to a first end of an auxiliary contact, and a drive circuit of the direct-current voltage-driven magnetic contactor includes
    a starting semiconductor switching element provided between a second end of the auxiliary contact and a negative electrode side of the exciting direct-current power supply, a direct-current power supply voltage detecting circuit that outputs a start instruction signal when an applied voltage of the exciting direct-current power supply exceeds a predetermined value, a driving direct-current power supply whose negative electrode side is connected to the negative electrode side of the exciting direct-current power supply, a first drive circuit that makes the starting semiconductor switching element perform an ON operation upon receiving the start instruction signal, using the driving direct-current power supply as an operating power supply, a charging capacitor whose one end is connected to a positive electrode side of the driving direct-current power supply via a diode, and whose other end is connected to the second end of the auxiliary contact, a current limiting semiconductor switching element connected in parallel to the auxiliary contact, and a second drive circuit that makes the current limiting semiconductor switching element perform a switching operation when a terminal voltage of the charging capacitor has reached the predetermined value.

5. The power converter according to claim 4, wherein a current detecting resistor is arranged between the second end of the auxiliary contact and a corresponding terminal of the current limiting semiconductor switching element, and the second drive circuit monitors a terminal voltage of the current detecting resistor, and carries out control to make the current limiting semiconductor switching element perform an ON/OFF operation at a fixed cycle when the terminal voltage is any one of equal to and less than a prescribed value, and extends an OFF operation period of the current limiting semiconductor switching element when the terminal voltage exceeds the prescribed value.

6. The power converter according to claim 4, wherein a current detecting resistor is arranged between the second end of the auxiliary contact and a corresponding terminal of the current limiting semiconductor switching element, an RC low-pass filter is provided between the current detecting resistor and the second drive circuit, and the second drive circuit monitors a terminal voltage of the current detecting resistor via the RC low-pass filter, and carries out control to make the current limiting semiconductor switching element perform an ON/OFF operation at a fixed cycle when the terminal voltage is any one of equal to and less than a prescribed value, and extends an OFF operation period of the current limiting semiconductor switching element when the terminal voltage exceeds the prescribed value.

* * * * *